United States Patent [19]
Perdue

[11] 3,754,372
[45] Aug. 28, 1973

[54] APPARATUS FOR MAKING THERMOPLASTIC VACUUM PACKAGES
[75] Inventor: Richard R. Perdue, Greenville, S.C.
[73] Assignee: W. R. Grace & Co., Duncan, S.C.
[22] Filed: Oct. 26, 1971
[21] Appl. No.: 192,583

Related U.S. Application Data
[62] Division of Ser. No. 9,580, Feb. 9, 1970.

[52] U.S. Cl.............................. 53/112 R, 53/112 A
[51] Int. Cl............................................ B65b 31/02
[58] Field of Search....................... 53/112 A, 112 R

[56] References Cited
UNITED STATES PATENTS
3,481,100  12/1969  Bergstrom..................... 53/112 A X
3,522,687  8/1970   Mahaffy....................... 53/112 A X
3,353,325  11/1967  Jensen et al.................. 53/112 A X Primary Examiner—Travis S. McGehee
Attorney—John J. Toney, William D. Lee Jr. et al.

[57] ABSTRACT

A vacuum package is prepared by placing a product between two webs at least one of which is heat softenable, applying differential air pressure to draw the heat softenable web against a heated surface, evacuating the space between the webs, and then releasing the web and using air or gas pressure to drive the softened web onto the product and at the same time contact the other web around the periphery of the product, thus enabling the two webs to be sealed together. A heated platen having vacuum ports therein is used to apply suction and heat to the softenable web. In the resulting package the heated web conforms closely to the shape of the product it contacts.

5 Claims, 8 Drawing Figures

APPARATUS FOR MAKING THERMOPLASTIC VACUUM PACKAGES

FIELD OF INVENTION

This invention relates to evacuated or hermetically sealed packages and a method and apparatus for producing same. Specifically, the preferred products packaged in the process of this invention are meat, cheese, and similar products; and, the preferred packaging materials are thermoplastic sheets or webs. The preferred products are usually sold directly to retail consumers from supermarkets or grocery stores.

DESCRIPTION OF THE PRIOR ART

Hermetically-sealed containers for cold cuts, cheeses and the like have been on the market for some time. These packages usually consist of two portions, one of which is cup-like and conforms closely to the shape of the product. The other is a base or closure portion which acts to close the package. The cup-like member is usually vacuum formed on an endless chain of vacuum forming dies or cavities. A thermoplastic material such as polyvinyl chloride or polyethylene in semi-rigid form is placed over the die cavity so that the edges of the sheet are restrained, then heated to softening temperature, and drawn into the die cavity by a vacuum which acts through the cavity walls. After cooling, the cup or cavity has been permanently set and formed and is ready to receive the product. Once the product has been placed in the cavity a closure is placed over the mouth of the cavity and the package is sealed. The method of closing and sealing the package is quite important if the package is to be evacuated and is to hold a good vacuum.

One prior art method of evacuating a package is disclosed in U.S. Pat. No. 3,126,681 issued to C. E. Cloud. In the Cloud Patent a heated piercing tip is used to pierce the closure web after it has been sealed to the cup-like member, withdraw air through the hole formed by the piercing, and thereafter seal the pierced hole.

In U.S. Pat. No. 2,896,385 issued to O. Gebhart, vacuum means are used to lift the covering film on a sealed package and while so lifted the film is slit by a knife. The package is then evacuated through the slit and afterwards sealed.

In U.S. Pat. No. 3,061,984 issued to R. A. Mahaffy, two packages are formed adjacent to each other and the film between the packages is slit so that air withdrawn through the slit will evacuate both packages. Thereafter a seal is made which forms part of the peripheral seal of each package.

In each of the foregoing mentioned vacuumizing processes, the package has to be slit or cut in some manner. Therefore, it is one of the objects of the present invention to provide a vacuumized package which eliminates the necessity of piercing or slitting the package after it has been sealed.

Another method of removing air from a package is disclosed in Canadian Pat. No. 810,510 issued to Oscar E. Seiferth et al. In this patent the closure is placed over the cup-like member and this assembly is placed in a vacuum chamber before the closure is sealed. While in the vacuum chamber the package is deformed so that the product will fill the entire interior volume of the package and thus force the unwanted air out. Subsequently, the package is then sealed and removed from the vacuum chamber. Accordingly, another of the objects of the present invention is to avoid deformation of the product or package yet at the same time provide a package in which the product is closely contacted by the surfaces of the webs which form the package.

Other objects and improvements which the subject invention makes over the prior art will become apparent to those skilled in the art from the following summary and description of the invention.

SUMMARY OF THE INVENTION

The Package

The present invention comprises a novel evacuated package and the process and apparatus for preparing the package. The package has two distinct portions, at least one of which is semi-rigid conforming closely to the shape of the product which the package encloses. This semi-rigid portion is usually transparent and is in most cases formed from a thermoplastic sheet material such as polyvinyl chloride, polyethylene, or laminates of these materials with other polymeric substances. The other portion of the package is the base or closure which is sealed to the shaped, semi-rigid portion. In one embodiment, this base or closure portion extends partially into the cavity which contains the product and conforms to the shape of that part of the product it contacts. The base is formed from a heat softenable thermoplastic material which can be flexible but is preferably semi-rigid. With the preferable semi-rigid base, a reclosable package may be made. To insure that the package remains gas tight both the semirigid portion and the base portion may be formed from gas impervious materials or may be laminated or coated with a gas impervious material such as saran.

THE PROCESS

In its broadest aspect the process of the subject invention comprises the steps of placing a product between first and second webs to form an unsealed package, restraining the second web from motion, moving the first web away from the second web so that the two webs are separated or maintaining web separation if the webs do not initially contact each other, evacuating the package interior through the separation between the webs, moving the first web into contact with the product and with the second web around the periphery of the product, and sealing the two webs together while they contact each other. In a more limited aspect the unsealed package is placed in a confined region, the first web is a heat softenable material which is moved by suction or differential air pressure against a heated surface, the package interior is evacuated by evacuating the confined region, and afterwards the suction is reversed and the air pressure forces the softened web around the product and into contact with the second web around the periphery of the product. In even more limited aspect, the second web is a formable material and includes vacuum forming a cavity in the second web so that a peripheral flange is left around the opening to the cavity.

THE APPARATUS

The apparatus of the present invention comprises a mold having a cavity suitable for vacuum forming, a platen mounted for reciprocal vertical motion above the mold cavity, means for drawing a vacuum or creating differential air pressure through said platen, means for heating the platen, and means for evacuating the mold cavity through the space between the platen and the mold. In a more limited aspect, the apparatus includes a vacuum head for sealing the mold cavity region from the atmosphere and the vacuum head encloses the platen and allows vertical reciprocal motion of the platen within the head.

DESCRIPTION OF THE DRAWINGS

The present invention may be better understood by reference to the drawings in which.

DESCRIPTION OF THE PREFERRED EMBODIMENT

THE APPARATUS

Figure 1:
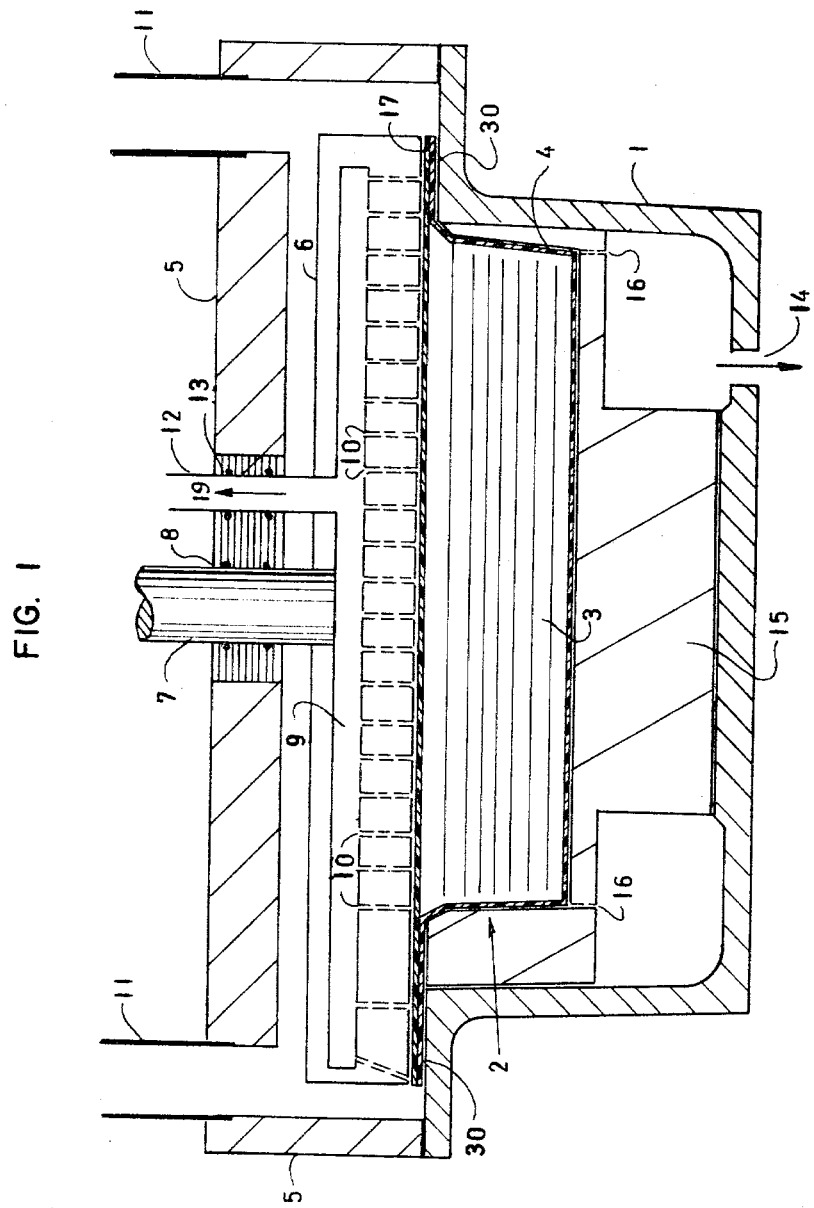
FIG. 1 is a cross-section of a vacuum forming mold cavity showing the arrangement of the platen, vacuum head, thermoplastic webs, and product.
Figure 2:
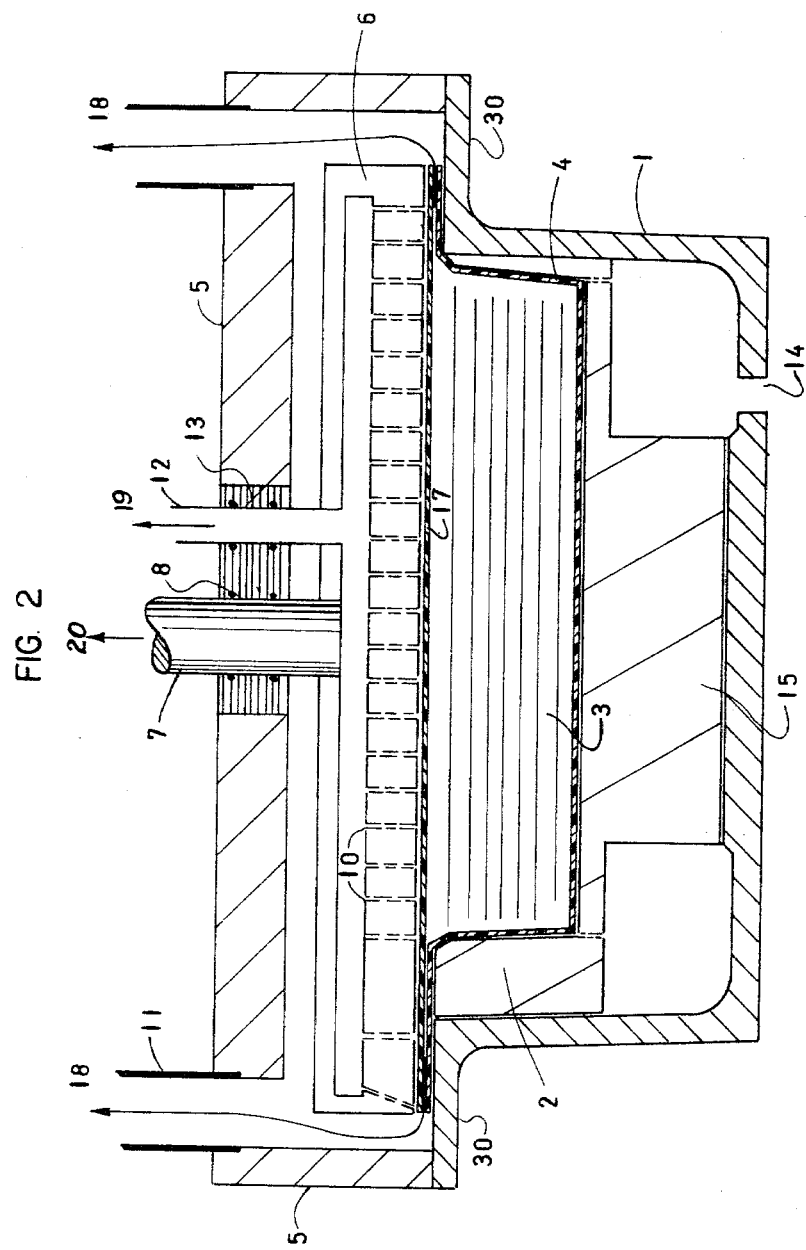
FIG. 2 is the same view as FIG. 1 except that the platen is in raised position to allow the evacuation of the mold cavity.
Figure 3:
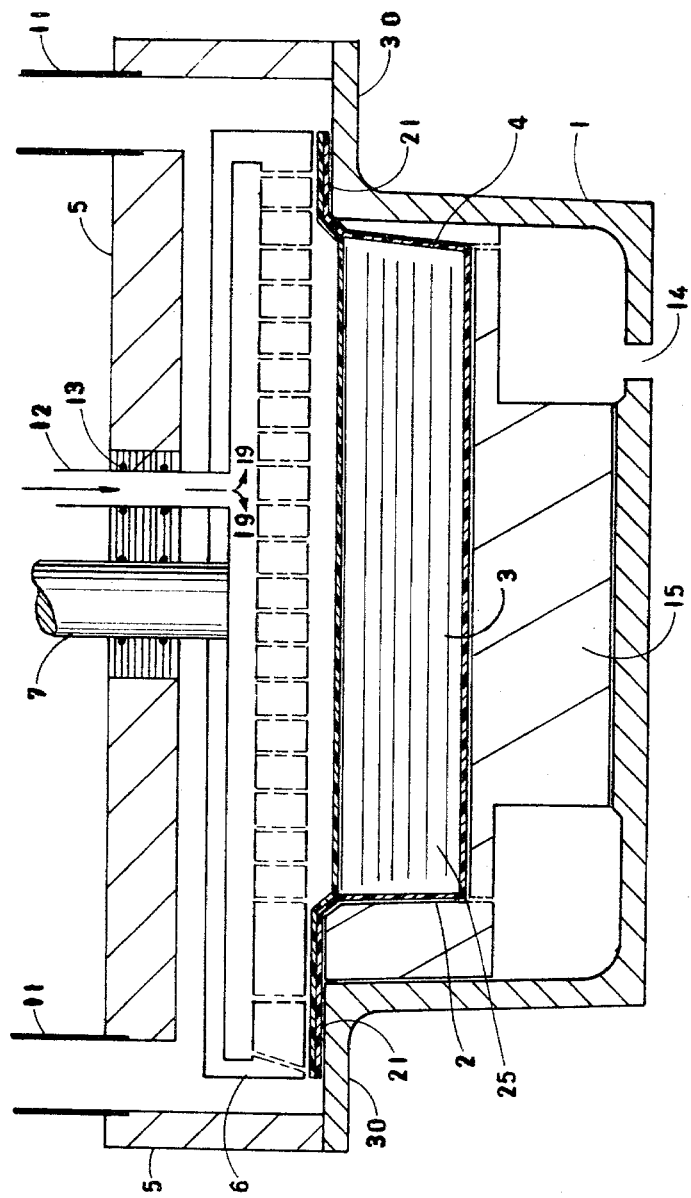
FIG. 3 is the same view as FIGS. 1 and 2 except that the platen has been lowered to the sealing position.

In the following description the process will necessarily be described together with the operation of the apparatus and vice-versa. FIGS. 1 - 3 show the apparatus in various operating stages of the process.

Turning now to FIG. 1, mold frame or pocket 1 is shown with the mold or die cavity insert 15 in place. The inserts 15 may be changed so that the die cavity 2 has a rectangular, circular or other desired shape. Leading out of die cavity 2 are exhaust or vacuum ports 16 which connect with the mold vacuum port 14. The port 14 is connected to a conventional vacuum pump which is not shown. The mold 1 shown with insert 15 is suitable for vacuum forming process in which the mouth of the die cavity 2 is covered with a heat softenable and formable thermoplastic material such as polyethylene or polyvinyl chloride or a laminated thermoplastic film which is heated, restrained in the flange area 30, and drawn into the die cavity 2 by the vacuum which acts through ports 16.

Still referring to FIG. 1, vacuum head 5 is shown resting against the outer portion of the flange area 30 of the mold frame 1. The vacuum head 5 operates to seal the entire area or region above the die cavity 2 from the atmosphere thus providing a confined region. Vacuum lines 11 lead from the vacuum head 5 to a conventional vacuum pump which is not shown. Mounted within vacuum head 5 is platen 6 which is carried by shaft 7. Shaft 7 penetrates the vacuum head and vacuum seals 8 about shaft 7 preserve the gas tightness of vacuum head 5. The motion of shaft 7 is preferably controlled by a cam shaft or it could be controlled by a crank shaft or manually. None of these means are shown as they are considered to be within the skill of the art. The motion of shaft 7 has to be regulated so that at the extreme downward descent of the shaft the platen will press against the flange area 30 with sufficient pressure to aid in the sealing of web 17 to web 4. At its extreme ascent the platen should be lifted about one-eighth of an inch from the flange area 30.

Also penetrating the vacuum head 5 is the platen vacuum line 12 which is connected to the platen plenum or manifold area 9. The vacuum line 12 at its other extremity is connected to still another vacuum pump which is not shown. Seals 13 surrounding line 12 preserve the vacuum within head 5. The platen plenum 9 has leading therefrom a plurality of vacuum passageways or ports 10. Vacuum drawn through these ports is sufficient to cause a sheet of plastic film or web 17 to cling tightly to the lower surface of the platen 6.

Figure 4:
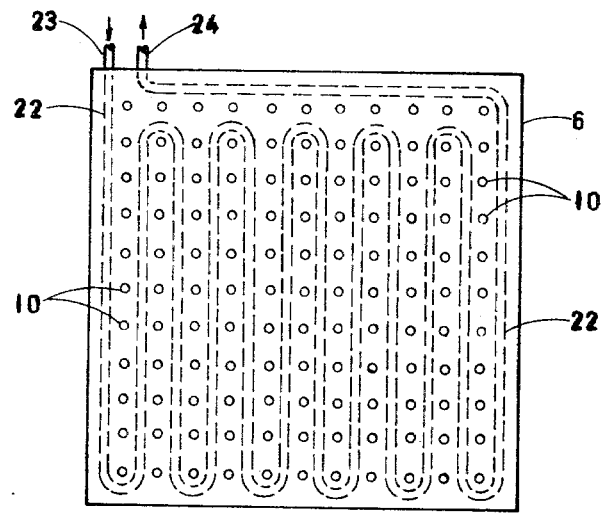
FIG. 4 is a view of the lower horizontal surface of the platen showing the vacuum ports in the platen and the arrangement of the steam lines as one embodiment of a means for heating the platen.

In FIG. 4 a view of the lower surface of the platen 6 is shown. The means for heating the platen which is shown here is a steam line 2 which runs through the array of vacuum ports 10. The steam enters through inlet 23 and exits through outlet 24. Steam or any other suitable gas can be used for heating the platen 6. As an alternative, electrical heating means could be used. For instance, resistance wiring could replace the steam line 22 as would be within the skill of the art to do.

THE PROCESS

To describe the process of the present invention reference will not be made to FIGS. 1 - 3. In FIG. 1 the forming web 4 has already been drawn down into die cavity 2 and has been filled with product 3. This forming web is preferably transparent polyvinyl chloride with a heat-sealable coating. The product which is placed into the cavity should be slightly smaller than the cavity 2, for example round luncheon mean should be about one-eighth inch smaller in diameter than the cavity. Also the luncheon meat should be about one-eighth of an inch lower than the top of the cavity. After the product 3 has been placed in the cavity a non-formed web 17 is placed over the cavity 2 so that the cavity is completely covered and the web 17 contacts the web 4 around the flange region 30 which surrounds the periphery of the opening or mouth of cavity 2. After the placing of the web 17 over the cavity 2 vacuum head 5 is lowered into place to seal the cavity area or region from the atmosphere and the vacuum which acts through ports 16 and 14 is turned on. This vacuum is relatively high being in the range from about 25 to 29 inches of mercury. The platen 6 which is now heated moves downwardly to the position shown in FIG. 1 and the vacuum which exhausts through line 12 in the direction of arrow 19 is turned on thus locking the film or web 17 securely against the lower surface of the platen 6. Platen 6 is then moved upwardly about one-eighth of an inch by the action of shaft 7 which moves in the direction of the arrow 20 so that the platen is now holding the film 17 in the position shown in FIG. 2. At this point the vacuum is turned on inside the head 5 and a vacuum of approximately 29 inches of mercury is drawn as indicated by arrows 18 through the vacuum lines 11. Now the package has been completely vacuumized and the platen 6 moves back down against the peripheral flange area 30 so that web 17 will form a seal with web 4. Next, the vacuum in the platen is turned off and air enters as indicated by arrows 19. Usually this air need only be at atmospheric pressure and, as the region inside the package which contains the product 3 has now been evacuated, the pressure of the atmospheric air wil force web 17 down against the product and will cause the softened web 17 to conform closely to the shape of the product which it contacts. The vacuum in the head 5 is turned off and the head raised so that the package can be removed.

In a continuous process which employs a series of vacuum forming cavities 2 carried by mold pockets or frames 1 the forming web 4 would be fed from a roll over the die cavities 2 in the direction of motion of the series of pockets. At a first station the web 4 would be clamped, heated, and vacuum drawn into conformance with mold cavity 2; or, a clamping frame could be used which clamps the edges of forming web 4 against the flange area 30 of the mold frame 1 and the plug assist could be used in conjunction with the vacuum forming. The vacuum, of course, would be drawn through ports 16 and 14. After the vacuum forming operation the chain of mold pockets 1 moves to a filling station where the product is placed in the newly formed cavities in the web 4. Next, the chain moves to the station where the vacuum head 5 with the platen 6 is located. The vacuumizing and sealing operation which has been described above would be repeated at this station. In FIGS. 1 - 3 such a chain of mold frames 1 would be moving perpendicularly into the plane of the drawing. Immediately before arriving at the vacuum head station a second web of film 17 is laid over the mold cavities and this web of film is laid continuously from a roll. The head 5 is then lowered thus pressing the leading and trailing edges of webs 4 and 17 tightly together. When the leading and trailing edges of the two webs are pressed together by the action of the vacuum head 5, the action of the platen 6 as shown in FIG. 2 will only separate the transverse edges of the two webs. The vacuum is then drawn through these transverse separations as shown by arrows 18. After the cycle has been completed the vacuum head is removed, and each package is then cut free from the web and subsequently trimmed to desired shape.

In an alternate continuous method, the cavities could be vacuum formed at one station from a continuous web which has stationary mold pockets, and then the continuous web moved sequentially to a product filling station and a vacuumizing station by means of parallel chains of clamps which grip the edges of the continuous web. After vacuumizing and sealing according to the process of the present invention, the now finished packages are again moved by parallel chains away from the sealing station to a cutting station where the packages are severed from the continuous web.

Figure 5:
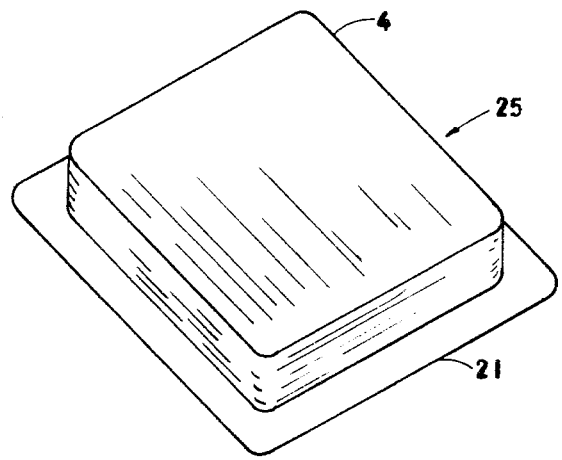
FIG. 5 is a perspective view of a package prepared according to the present invention in the position in which the package is normally displayed for supermarket sale.

The completed package 25 has the appearance shown in FIG. 5. The forming web 4 is now the top of the package and the flange 21 is the area in which the two webs are sealed together.

Figure 6:
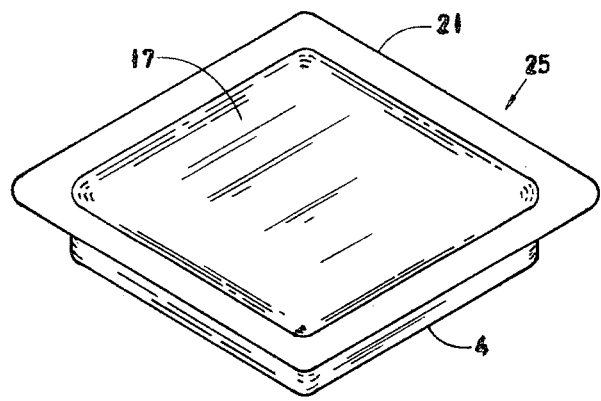
FIG. 6 is the package of FIG. 5 in an upside down position.

FIG. 6 shows the package of FIG. 5 turned upside down and shows how the base or covering web 17 is recessed partially into the cavity which contains the product.

Figure 7:
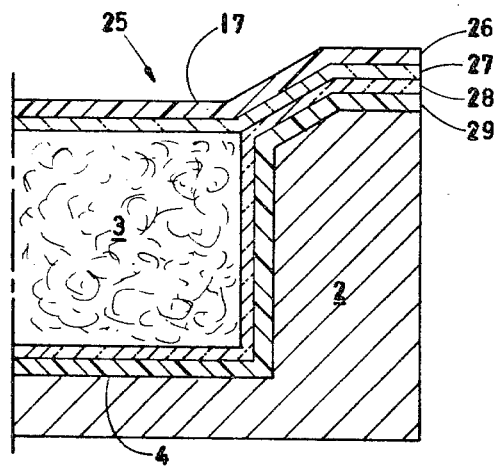
FIG. 7 is a partial cross-section of a package according to the present invention showing, in exaggerated form, a preferred arrangement of the layers in the laminated webs; and, FIG. 8 is a cross-sectional view of a mold cavity and package showing the reclosable cover feature of one embodiment of the present invention.

FIG. 7 shows package 25 containing product 3 before being removed from die cavity 2. In this instance, forming web 4 is a laminate composed of layers 28 and 29, and covering or base web 17 is a laminate comprising layers 26 and 27. Preferably when such laminates are used the two contacting layers, layers 27 and 28, are the same substance. For example, layers 27 and 28 would both be polyethylene or both could be saran so that either a polyethylen-to-polyethylene or saran-to-saran seal would be formed. Saran is a particularly desirable laminating material because of its ready sealing capabilities and its gas barrier properties.

The supporting layer 29 of the forming web 4 is preferably a semi-rigid material such as a polymer or copolymer of polyvinyl chloride which is transparent. The thickness of the polyvinyl chloride layer may run 5 to 15 mils and greater with a preferred thickness being about 10 mils. The saran layer 28 can be in the range of from 0.5 to 3 or 4 mils with a preferred thickness being about 2 mils. The forming web 4 can also be a laminate of three layers and a preferred embodiment of this would be a polyvinyl chloride copolymer layer of about 10 mils followed by a layer of about 2 mils of saran and, on top of the saran, would be a 1 mil layer of polyethylene. For this triple layered forming web 4 the covering or base web 17 would preferably be also a triple layered film having as an outer layer about 0.5 mils of mylar followed by a coating of saran and then 4 mils of polyethylene. The polyethylene layers in both the forming web 4 and covering or base web 17 would be heat sealed together. In addition, laminates comprising only polyvinyl chloride and polyethylene layers can be used as the forming web 4. Also the base web 17 can be formed of other materials such as nylon.

The recessed area of package 25 which is shown in FIG. 6 and which is formed when air pressure forces web 17 down against product has a functional feature in that the recess will act as a stacking or nesting feature for giving stability to staked packages. A greater degree of conformance of the web 17 with the shape of the product can be achieved by using superatmospheric pressure when the vacuum in the platen is released. Pressures of 40 to 100 psi used while web is still warm and formable will accomplish this. If a semi-rigid material is used for the web 17 then a recloseable package can be formed. Thus, if in FIG. 7 layers 28 and 27 are saran and layers 29 and 26 are polyvinyl chloride an easy to open seal will have been formed as the saran forms an adequate but low strength bond, and the package will be recloseable when opened as the layer 26, in this instance being polyvinyl chloride, will possess sufficient rigidity to retain the integrity of the shape of the base 17.

Figure 8:
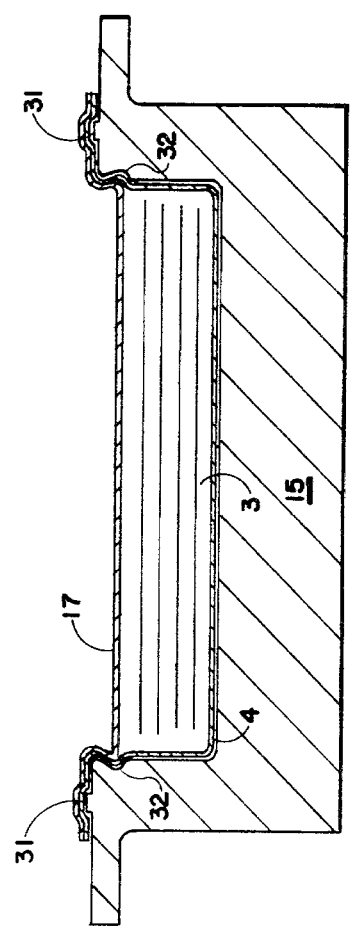

FIG. 8 shows a package according to the present invention which incorporates a mechanical locking feature that enables a positive reclosing of the package. Cavity insert 15 is shown with forming web 4 lining the cavity. Inside the cavity of the forming web is product 3 and covering the product 3 is covering or closure web 17. In this embodiment both webs 4 and 17 are semi-rigid. Mechanical locking notch 32 extends around the periphery of the cavity just below the mouth or rim of the cavity. The shoulder or notch 32 can be as little as one-eighth inch below the rim but is preferably in the range from about three-sixteenths inch to three-eighths below the rim. In the vacuum forming process which forms web 4 into the shape of the cavity, vacuum ports (not shown) would be provided in the notch area to draw the web 4 into conforming shape and form a peripheral notch. After the product 3 is placed in the cavity, it is covered by closure web 17 and the vacuumizing process of the present invention, described above, is repeated. The differential air pressure, when applied as shown in FIG. 3, will force the closure web 17 into the locking notch thus forming a reverse tapered closure protrusion in web 17 which could not be achieved in prior art processes. Because the forming materials of the webs 4 and 17 are semi-rigid, the package can be deformed slightly to release it from the mold 15 without breaking the seals. The package resulting in this embodiment would have the same appearance as the package shown in FIG. 5 when the forming web 4 is on the topside; and its appearance when turned over would resemble that of the package in FIG. 6, the only difference being the reverse tapered locking means formed by the notch 32 in FIG. 8. The taper shown in FIG. 3 is not reversed since in the path traversed along closure web 17 from the seal area 21 to the top center of the package (below the center of platen 6), the maximum slope encountered is less than 90°, i.e., the sloped or tapered portion of the closure web 17 does not anywhere make an angle greater than 90° with respect to the horizontal portion. Following the corresponding path in FIG. 8, a slope greater than 90° is encountered, hence the "reverse" taper. As is well within the skill of the art, an opening tab can be provided in the flange or seal area 21 of the embodiment shown in FIG. 3 or the corresponding area of the embodiment of the package shown in FIG. 8. Such a tab can be a protruding ribbon positioned and sealed between the webs 4 and 17 in the seal area 21; or, one of the webs can have notches or cut-outs along its edge in the seal area 21 which will provide an opening tab.

Typical dimensions of a package would be in the order of 4 ½ inches for the width or diameter of mold cavity and the mold cavity depth would usually vary between one-half inch and 1 inch.

Referring again to FIG. 8, ridges 31 are seen in the seal or flange area. These are indexing ridges for the platen and enable a single size platen to be used with changes in mold cavity shapes and sizes.

What I claim is:

1. Apparatus for preparing an evacuated package from heat sealable and softenable sheet material comprising:
   a. a mold having a cavity suitable for vacuum forming, said mold having a peripheral horizontal surface surrounding said cavity;
   b. a platen disposed for reciprocal vertical motion above said mold cavity; said platen contacting said peripheral horizontal surface at the lower extreme of its motion and covering said mold cavity;
   c. means for drawing a vacuum through said platen to hold said sheet of material thereagainst;
   d. means for uniformly heating said platen; and,
   e. means for evacuating the mold cavity through the space between the platen and said peripheral horizontal surface.

2. Apparatus for preparing vacuumized thermoplastic packages from heat sealable thermoplastic web materials comprising:
   a. a mold having a forming cavity, said mold having a horizontal surface surrounding the upper periphery of said cavity;
   b. means for drawing a vacuum through said cavity whereby formable sheet material may be drawn into said cavity to conform to the shape of the cavity;
   c. a vacuum head for sealing the mold cavity region from the atmosphere;
   d. a platen associated with said vacuum head, said platen being disposed for reciprocal vertical motion within the region sealed by the vacuum head, said platen covering the mold cavity and contacting said horizontal surface at its extreme descent;
   e. means for drawing a vacuum through said platen to hold a portion of said materials thereagainst;
   f. means for uniformly heating said platen; and,
   g. means for evacuating the region sealed by said vacuum head.

3. The apparatus of claim 2 wherein means for drawing a vacuum through said platen includes a plurality of passageways in the platen.

4. The apparatus of claim 3 wherein the means for heating said platen includes additional passageways through which steam is circulated.

5. The apparatus of claim 2 wherein the means for heating said platen is electrical resistance means.

* * * * *